US005320007A

United States Patent [19]

Weirauch

[11] Patent Number: 5,320,007
[45] Date of Patent: Jun. 14, 1994

[54] METHOD FOR POSITIONING AND PROCESSING LPE FILMS

[75] Inventor: Donald F. Weirauch, Dallas, Tex.

[73] Assignee: Texas Instruments Incorporated, Dallas, Tex.

[21] Appl. No.: 977,992

[22] Filed: Nov. 18, 1992

[51] Int. Cl.$^5$ ............... B23B 1/00; B23B 5/00; B23B 31/00
[52] U.S. Cl. ............ 82/1.11; 82/151; 82/165; 82/166; 51/216 A; 269/900
[58] Field of Search .......... 82/151, 162, 165, 166, 82/1.11; 51/216 A, 217 R, 240 A; 409/221, 227, 903; 269/289 R, 296, 309, 900

[56] References Cited

U.S. PATENT DOCUMENTS

| | | | |
|---|---|---|---|
| 2,076,207 | 4/1937 | Powell | 269/900 |
| 2,324,476 | 7/1943 | Becker | 269/900 |
| 2,367,045 | 1/1945 | Nightingale | 82/165 |
| 2,455,071 | 11/1948 | Leone | 82/166 |
| 3,143,907 | 8/1964 | Ulrich | 82/165 |
| 4,121,817 | 10/1978 | Pavlovsky | 269/900 |
| 4,125,042 | 11/1978 | Barron | 82/165 |
| 4,671,145 | 6/1987 | Fehrenbach et al. | 82/165 |
| 5,026,033 | 6/1991 | Roxy | 269/900 |

OTHER PUBLICATIONS

"Modular Fixturing" Edward G. Hoffman Manufacturing Technology Press 1987.

*Primary Examiner*—William E. Terrell
*Attorney, Agent, or Firm*—Richard A. Stoltz; James C. Kesterson; Richard L. Donaldson

[57] ABSTRACT

A method and apparatus are provided for holding and positioning objects for a single diamond point turning operation. The objects which may include liquid phase epitaxy films are mounted on multiple platforms (10, 46). The platforms (10, 46) are securely connected to a base (20). The platforms (10, 46) are positioned, independently from one another, for elevation and orientation relative to the base (20) while the platforms (10, 46) are securely connected to the base (20).

5 Claims, 4 Drawing Sheets

METHOD FOR POSITIONING AND PROCESSING LPE FILMS

TECHNICAL FIELD OF THE INVENTION

This invention relates in general to mechanical devices, and in particular to a method and apparatus for holding and positioning objects.

BACKGROUND OF THE INVENTION

The thickness of a mercury cadmium telluride ("MCT") liquid phase epitaxy ("LPE") film affects the MCT device's infrared ("IR") cutoff value. A specified amount can be removed from the LPE film by a diamond point turning ("DPT") milling operation in order to achieve both a suitable IR cutoff value and suitable surface smoothness across the entire LPE surface area. Nevertheless, in forming an LPE film on a CdTe substrate, the LPE film or even the CdTe substrate can be tapered, non-uniform and non-flat, such that the LPE film is subject to a unique amount of removal. Accordingly, an LPE film should be uniquely tilted for the DPT operation to remove the suitable amount.

With some previous techniques, a single DPT operation is performed on only one LPE film at a time. One LPE film is held by a special holder which permits the LPE film's surface to be tilted to the suitable orientation. After suitably tilting the one LPE film, the DPT operator removes the specified amount from the LPE film.

Nevertheless, as demand for LPE materials increases, it is inefficient to perform the single DPT operation on only one LPE film at a time. Undesirably, such previous techniques fail to simultaneously hold and position multiple LPE films for the single DPT operation. Typical previous techniques fail to address challenges of orienting and elevating each of multiple LPE films independently from one another for a single DPT operation. Accordingly, with previous techniques, the single DPT operation fails to remove a respective amount from an LPE film to an accuracy of ± 2 $\mu$m or better, independent of the amount removed from another LPE film by the single DPT operation.

Thus, a need has arisen for a method and apparatus for holding and positioning objects, in which multiple LPE films are simultaneously held and positioned for a single DPT operation. Further, a need has arisen for a method and apparatus for holding and positioning objects, which addresses challenges of orienting and elevating each of multiple LPE films independently from one another for a single DPT operation. Also, a need has arisen for a method and apparatus for holding and positioning objects, in which the single DPT operation removes a respective amount from an LPE film to an accuracy of ± 2 $\mu$m or better, independent of the amount removed from another LPE film by the single DPT operation.

SUMMARY OF THE INVENTION

In a method and apparatus for holding and positioning objects, the objects are held to multiple platforms. The platforms are securely connected to a base. The platforms are positioned, independently from one another, for elevation and orientation relative to the base while the platforms are securely connected to the base.

It is a technical advantage of the present invention that multiple LPE films are simultaneously held and positioned for a single DPT operation.

It is another technical advantage of the present invention that challenges are addressed of orienting and elevating each of multiple LPE films independently from one another for a single DPT operation.

It is a further technical advantage of the present invention that the single DPT operation removes a respective amount from an LPE film to an accuracy of ± 2 $\mu$m or better, independent of the amount removed from another LPE film by the single DPT operation.

BRIEF DESCRIPTION OF THE DRAWINGS

For a more complete understanding of the present invention, and the advantages thereof, reference is now made to the following descriptions taken in conjunction with the accompanying drawings, in which:

FIG. 1b is a front sectional view of the platform of FIG. 1a taken substantially along line 1b—1b in FIG. 1a;

FIG. 2b is a left side sectional view of the platform of FIG 1a, taken substantially along line 2b—2b in FIG. 1a;

DETAILED DESCRIPTION OF THE INVENTION

The preferred embodiment of the present invention and its advantages are best understood by referring to FIGS. 1-8b of the drawings, like numerals being used for like and corresponding parts of the various drawings.

Figure 1A:
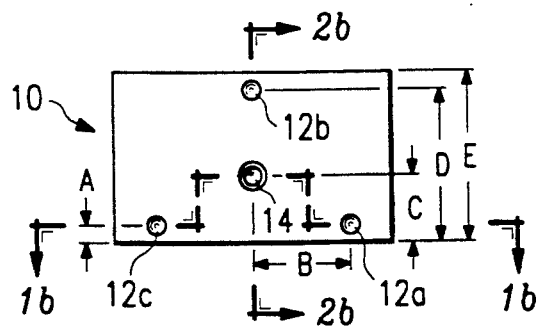
FIG. 1a is a bottom plan view of a platform of the preferred embodiment.
Figure 1B:
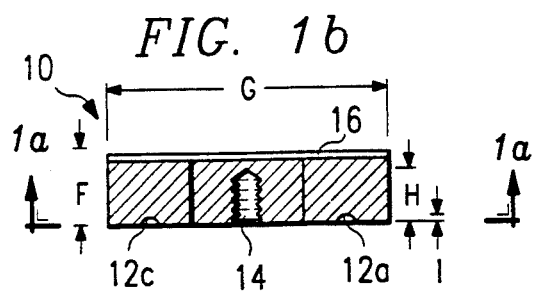

FIG. 1a is a bottom plan view of a stainless steel "block" or platform 10 of the preferred embodiment. FIG. 1b is a front sectional view of platform 10, taken substantially along line 1b—1b in FIG. 1a. In the preferred embodiment, dimensions A, B, C, D, E, F, G, H, and I of FIGS. 1a-b have approximate values set forth hereinbelow in Appendix A. Platform 10 has three substantially identical dimples 12a-c and a drilled and tapped "10-32" hole 14. Referring to FIG. 1a, each of dimples 12a-c has a diameter of approximately 3/32 inches.

Referring to FIG. 1b, platform 10 holds an object 16 such as an LPE film formed on a CdTe substrate. In the preferred embodiment, such an LPE film is mounted to platform 10 by gluing object 16 to a top surface of platform 10 using bees wax or paraffin wax. Alternatively, object 16 can be another type of object, such as a mirror or optic prism. For improved accuracy, the top surface of platform 10 is made substantially flat by lapping to within ±0.1 μm.

Figure 2A:
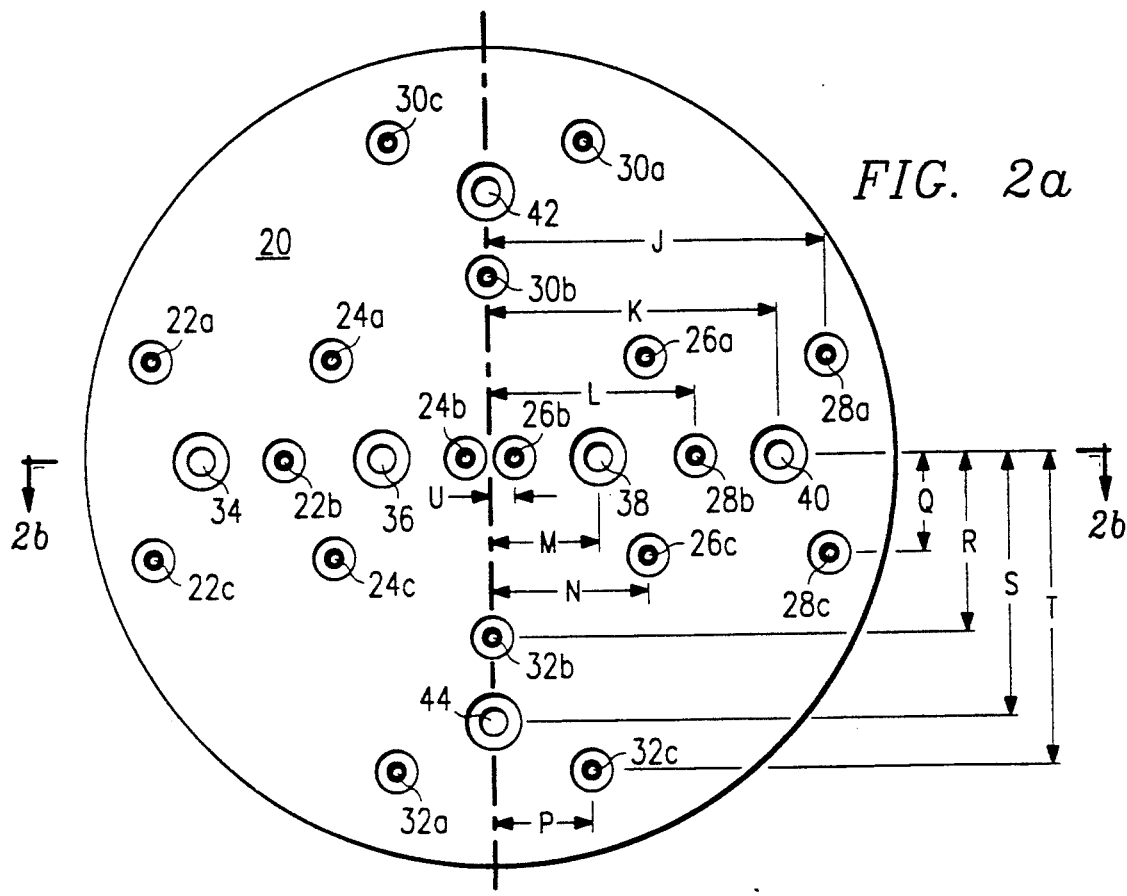
FIG. 2a is a bottom plan view of a base of the preferred embodiment.
Figure 2B:
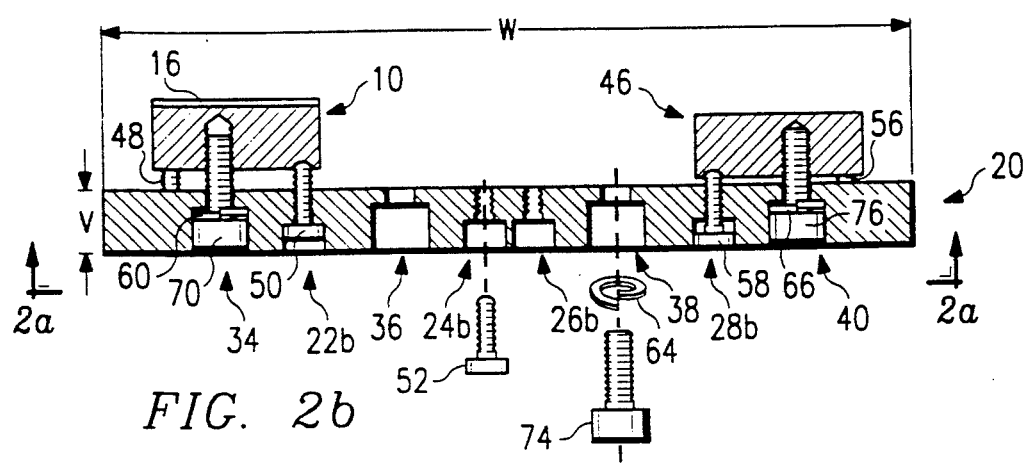
FIG. 2b is a front sectional view of the base of FIG. 2a, taken substantially along line 2b—2b in FIG. 2a; further

FIG. 2a is a bottom plan view of a stainless steel "puck" or base 20 of the preferred embodiment. FIG. 2b is a front sectional view of base 20, taken substantially along line 2b—2b in FIG. 2a. Further, FIG. 2b is a left side sectional view of platform 10, taken substantially along line 2b—2b in FIG. 1a.

In the preferred embodiment, dimensions J, K, L, M, N, P, Q, R, S, T, U, V, and W of FIGS. 2a-b have approximate values set forth hereinbelow in Appendix A. Base 20 has eighteen substantially identical drilled and tapped "2-56" adjusting screw holes 22a-c, 24a-c, 26a-c, 28a-c, 30a-c, and 32a-c. Also, base 20 has six substantially identical holding screw holes 34, 36, 38, 40, 42, and 44, each having a diameter of approximately 0.196 inches.

As shown in FIG. 2b, base 20 securely holds and positions platform 10 and a substantially identical platform 46. For example, base 20 securely holds and positions platform 10 at a suitable orientation and elevated height above base 20 for an operation such as DPT, diamond point milling, surface grinding, blanchard grinding, or surface milling. Moreover, base 20 can securely hold and position platform 10 at a suitable elevation and orientation for other operations such as directing a mirror or optic prism.

Referring to FIG. 2b, substantially identical adjusting screws 48 and 50 are screwed through adjusting screw holes 22a and 22b, respectively, for engageably contacting dimples 12a and 12b, respectively, of platform 10. A substantially identical adjusting screw (not shown in FIG. 2b) is screwed through adjusting screw hole 22c (FIG. 2a) for engageably contacting dimple 12c of platform 10.

Similarly, substantially identical adjusting screws 56 and 58 are screwed through adjusting screw holes 28a and 28b, respectively, for engageably contacting first and second dimples, respectively, of platform 46. A substantially identical adjusting screw (not shown in FIG. 2b) is screwed through adjusting screw hole 28c for engageably contacting a third dimple of platform 46. Likewise, adjusting screws can be screwed through adjusting screw holes 24a-c, 26a-c, 30a-c, and 32a-c for adjusting additional platforms as discussed further hereinbelow in connection with FIG. 3. Each of the adjusting screws is a "2-56" capped screw having a rounded end and a threaded length of approximately 0.4 inches.

Also, FIG. 2b shows substantially identical split washers 60 and 66 for insertion in holding screw holes 34 and 40, respectively. Further, FIG. 2b shows substantially identical holding screws 70 and 76 for insertion through split washers 60 and 66, respectively, and through holding screw holes 34 and 40, respectively. As shown in FIG. 2b, holding screw 70 is screwed into hole 14 of platform 10, such that platform 10 is connected to base 20.

Similarly, holding screw 76 is screwed into platform 46, such that platform 46 is connected to base 20. Likewise, substantially identical split washers and holding screws can be inserted through holding screw holes 36, 38, 42 and 44, for connecting additional platforms to base 20 as discussed further hereinbelow in connection with FIG. 3. Each of the holding screws is a stainless steel "10-32" capped screw having a rounded end and a threaded length of approximately 0.65 inches.

In the preferred embodiment, base 20 provides ample room for housing the heads of adjusting screws 48, 50, 56 and 58, and of holding screws 70 and 76, such that these heads do not protrude beyond the bottom surface of base 20 after platforms 10 and 46 are connected to base 20. By keeping these heads from protruding beyond the bottom surface of base 20, base 20 is able to rest stably on a substantially flat surface. For improved accuracy, the bottom surface of base 20 is made substantially flat by lapping to within ±0.1 μm.

As an example, holding screw 70 is inserted through split washer 60 and through holding screw hole 34 and is screwed into hole 14 of platform 10. Then, holding screw 70 is tightened with a torque wrench to a suitable torque, such that platform 10 is securely connected to base 20. While platform 10 is securely connected to base 20, the adjusting screws through holes 22a-c are adjusted for positioning platform 10 at a suitable elevation and orientation relative to base 20. In a substantially identical manner, platform 46 is securely connected to base 20 and adjusted to a suitable elevation and orientation independent of another platform. In a significant aspect of the preferred embodiment, split washers 60 and 66 provide suitable tension for securely holding and positioning platforms 10 and 46, respectively, over a range of adjustments of the adjusting screws. Accordingly, platforms 10 and 46 are positionable for elevation and orientation relative to base 20 while platforms 10 and 46 are securely connected to base 20 as shown in FIG. 2b.

Figure 3:
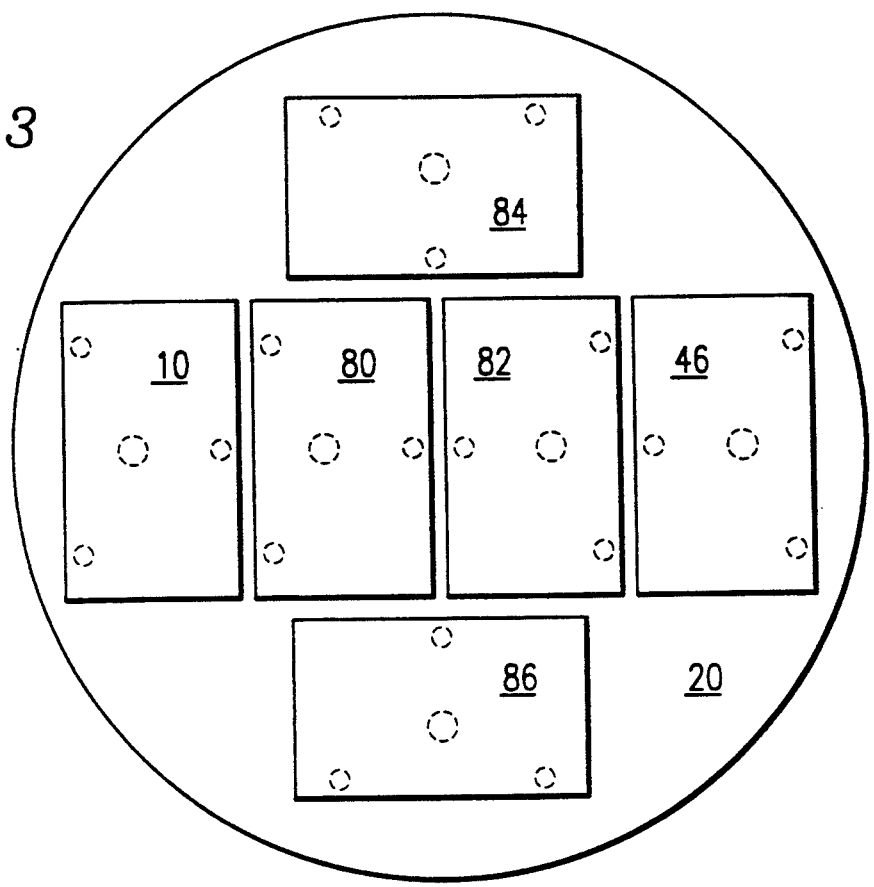
FIG. 3 is a top plan view of the base of FIGS. 2a-b, and of multiple platforms of the type shown in FIGS. 1a-b held and positioned on the base.

FIG. 3 is a top plan view of base 20 and of platforms 10 and 46 securely connected to base 20. Further, FIG. 3 is a top plan view of multiple platforms 80, 82, 84, and 86, each being substantially identical to platform 10. As with platform 10, platforms 80, 82, 84, and 86 are securely connected to base 20 and are independently positioned to suitable elevations and orientations. Advantageously, base 20 accurately maintains the orientation and elevation of each platform, such that each platform is securely connected to base 20. As shown in FIG. 3, base 20 securely holds and positions up to six platforms, each being independently oriented and elevated. In alternative embodiments, a o different number of platforms can be securely held and positioned.

Base 20 securely holds and positions the multiple platforms 10, 46, 80, 82, 84, and 86 simultaneously at independently positioned orientations and elevations, thereby permitting multiple LPE films to be diamond point turned in a single DPT operation. Accordingly, in the preferred embodiment, six LPE films are respectively held and positioned securely on platforms 10, 46, 80, 82, 84, and 86, such that an independently adjusted amount is removed from each LPE film by a single DPT operation.

Notably, when a single DPT operation is performed on only one LPE film at a time, only the orientation of the LPE film needs to be adjusted. After adjusting the LPE film's orientation, a human operator can control the amount removed from the LPE film. By comparison, when multiple LPE films are simultaneously positioned for a single DPT operation, both the orientation and elevation of each LPE film need to be adjusted. This is because a human operator is unable to practically control the amount removed from each LPE film, unless the elevations of all LPE films are suitably adjusted relative to one another. Accordingly, typical previous techniques fail to address the challenges of orienting and elevating each of multiple LPE films independently from one another for a single DPT operation.

Figure 4:
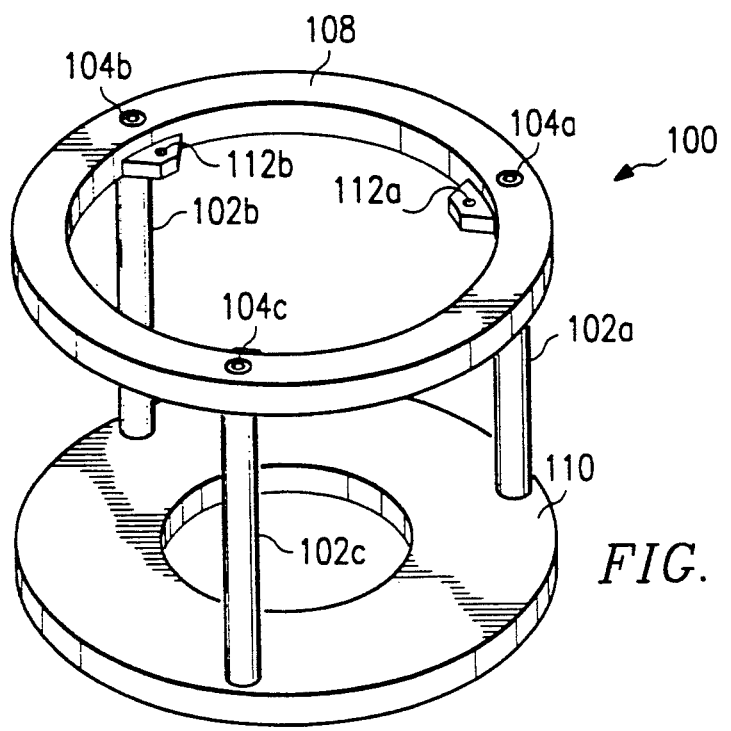
FIG. 4 is a perspective view of a stand of the preferred embodiment.
Figure 5:
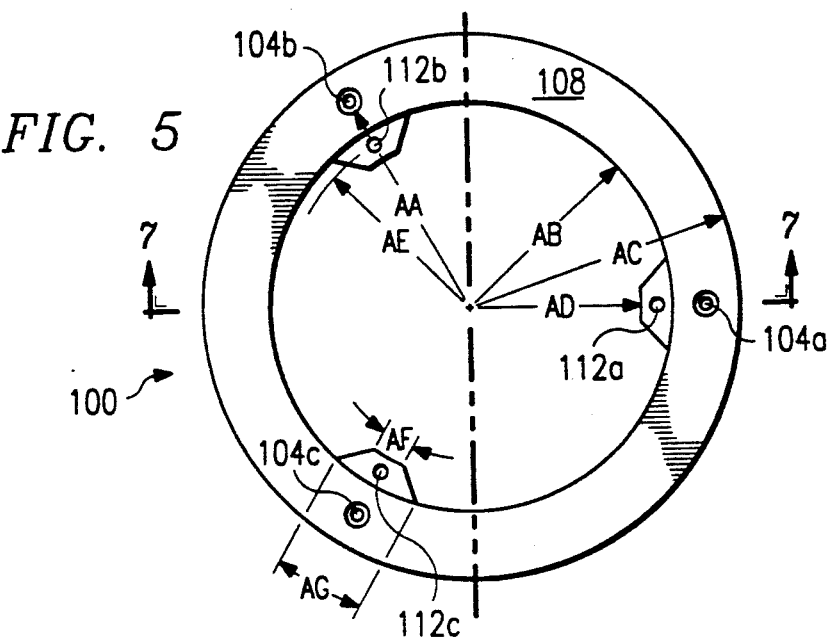
FIG. 5 is a top plan view of the stand of FIG. 4.
Figure 6:
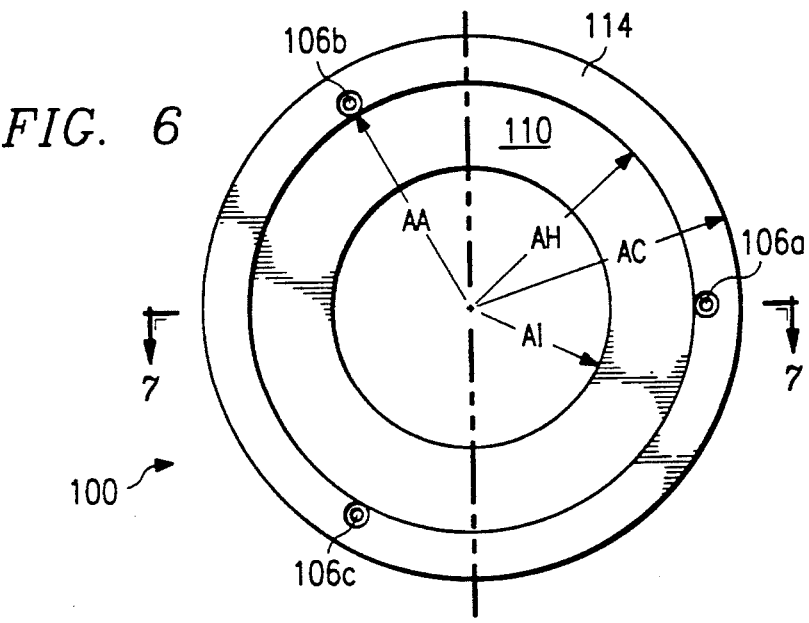
FIG. 6 is a bottom plan view of the stand of FIG. 4.
Figure 7:
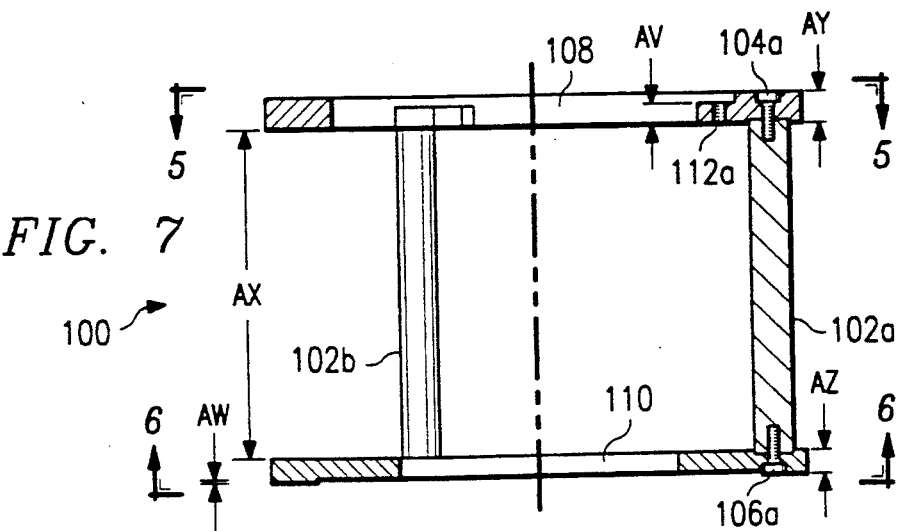
FIG. 7 is a left side sectional view of the stand of FIG. 4, taken substantially along lines 7—7 in FIGS. 5 and 6.

FIG. 4 is a perspective view of a support stand, indicated generally at 100, of the preferred embodiment. FIG. 5 is a top plan view of stand 100 of FIG. 4. FIG. 6 is a bottom plan view of stand 100 of FIG. 4. FIG. 7 is a left side sectional view of stand 100 of FIG. 4, taken substantially along lines 7—7 in FIGS. 5 and 6. In the preferred embodiment, dimensions AA, AB, AC, AD, AE, AF, AG, AH, AI, AV, AW, AX, AY, AZ of FIGS. 5–7 have approximate values set forth hereinbelow in Appendix A.

As discussed further hereinbelow in connection with FIG. 8a, stand 100 supports base 20 so that room is provided for accessing the bottom surface of base 20. By accessing the bottom surface of base 20, one or more platforms are connected to base 20 and adjusted to achieve a suitable elevation and orientation as discussed further hereinabove in connection with FIGS. 1–3.

Referring to FIGS. 4–7, three support posts 102a–c are connected by "¼-20" capped screws 104a–c, respectively, to a stainless steel top ring 108 at 120° intervals, and by 106a–c, respectively, and by "¼-20" capped screws 106a–c, respectively, to a stainless steel bottom ring 110 at 120° intervals. Each of support posts 102a–c has a diameter of 0.5 inches. Support posts 102a–c are formed of INVAR, which advantageously has a low coefficient of expansion for improved accuracy.

Top ring 108 has three drilled and tapped "10-32" holes 112a–c discussed further hereinbelow in connection with FIG. 8a. For improved accuracy, outer area 114 (FIG. 6) of bottom ring 110 is made substantially flat by lapping to within ±0.1 μm. Alternatively, outer area 114 can be made substantially flat by blanchard grinding.

Figure 8A:
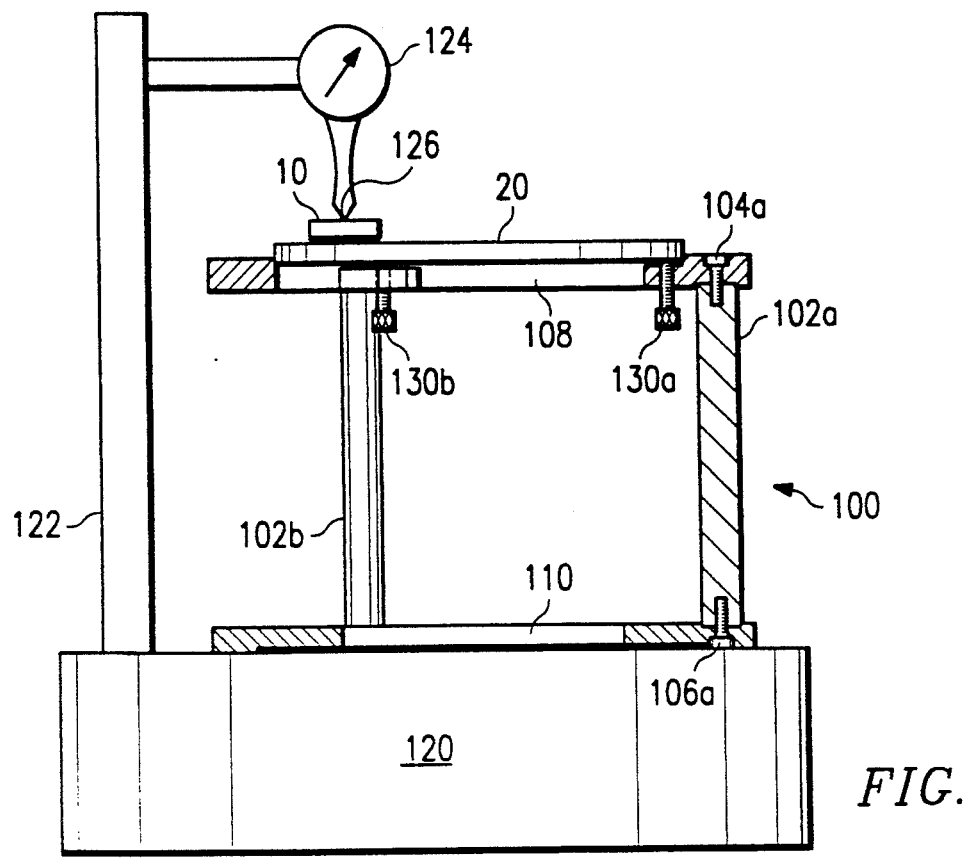
FIG. 8a is a left side elevational view of a reference structure of the preferred embodiment, the left side sectional view of FIG. 7 of the stand resting on the reference structure, a left side elevational view of the base of FIGS. 2a-b resting on the stand, and a left side elevational view of the platform of FIGS. 1a-b held and positioned on the base.
Figure 8B:
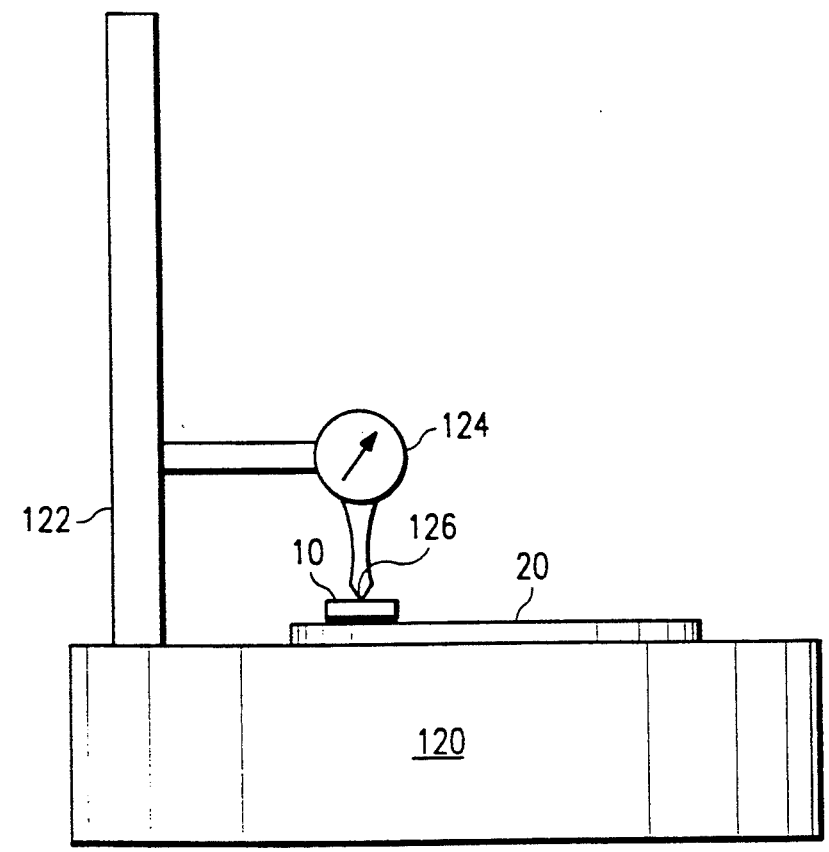
FIG. 8b is the left side elevational view of FIG. 8a of the reference structure, the left side elevational view of FIG. 8a of the base resting on the reference structure, and the left side elevational view of FIG. 8a of the platform held and positioned on the base.

FIG. 8a is a left side elevational view of a reference structure 120 of the preferred embodiment, the left side sectional view of FIG. 7 of stand 100 resting on reference structure 120, a left side elevational view of base 20 resting on stand 100, and a left side elevational view of platform 10 held and positioned on base 20. FIG. 8b is the left side elevational view of FIG. 8a of reference structure 120, the left side elevational view of FIG. 8a of base 20 resting on reference structure 120, and the left side elevational view of FIG. 8a of platform 10 held and positioned on base 20.

In the preferred embodiment, reference structure 120 is a flat granite base having a substantially flat top surface. An arm 122 is mounted on reference structure 120. A dial gauge 124 (such as a Mitutoyo gauge) is slidably mounted on arm 122 for measuring a distance of a point 126 from reference structure 120.

Referring to FIG. 8a, substantially identical leveling screws 130a–b are screwed through holes 112a–b, respectively, of top ring 108. Each of leveling screws 130a–b is a "10-32" brass screw having a knurled head and a rounded end. Likewise, a leveling screw (not shown) substantially identical to screw 130a is screwed through hole 112c (FIG. 5). As shown in FIG. 8a, the leveling screws through holes 112a–c operate as adjustable leveling pins for supporting base 20 at three locations. In tests, the position of base 20 on the leveling screws remains unchanged over an indefinite period of time, thereby confirming the stability of stand 100 and of the leveling screws.

In the preferred embodiment, stand 100 is initialized relative to base 20. Initially, screw holes 22a and 22c (FIG. 2a) are centered around leg 102c of stand 100. Dial gauge 124 is initialized to a reading of "0" at a specified location on base 20. Then, stand 100 is rotated such that screw holes 22a and 22c are centered around leg 102b of stand 100, and leveling screw 130b is adjusted so that dial gauge 124 reads "0" at a specified location on base 20.

Similarly, stand 100 is again rotated such that screw holes 22a and 22c are centered around leg 102a of stand 100, and leveling screw 130a is adjusted so that the dial gauge 124 reads "0" at a specified location on base 20. This technique of rotation and adjustment is repeated multiple times so that irrespective of the position of stand 100, dial gauge 124 always reads "0" at each specified location on base 20. This technique helps ensure that, across the top surface of base 20, the distance to the top surface of reference structure 120 is substantially constant.

After initializing stand 100 relative to base 20, up to six LPE films are respectively mounted on respective platforms, each platform being substantially identical to platform 10 of FIGS. 1a–b. The thickness of each LPE film is measured at multiple points to determine a suitable amount for removal. While base 20 is supported on stand 100, each platform is connected to base 20. After connecting each platform to base 20, dial gauge 124 is used to measure a set of locations on each platform. In response to such measurements, the adjusting screws of each platform are independently adjusted so that each platform is held and positioned at a suitable elevation and orientation for removing the suitable amount of LPE film.

After independently positioning each platform, base 20 is transferred from stand 100 to reference structure 120 as shown in FIG. 8b. With base 20 on reference structure 120, the set of locations on each platform is remeasured with dial gauge 124 to verify transferability of base 20. In tests, the measurements with base 20 on reference structure 120 are within 1 μm (relative to one another) of the measurements with base 20 on stand 100.

After verifying transferability of base 20, base 20 is transferred from reference structure 120 to a site for the DPT operation. There, the independently adjusted amounts are removed from the LPE films by a single DPT operation. After the DPT operation, base 20 is returned to reference structure 120. With base 20 on reference structure 120, one reference location on one platform is again measured to verify the amount removed. Finally, if desired, the thickness of each LPE film can again be measured at multiple points to finally verify the amount removed.

Different amounts can be removed from the LPE films. For each LPE film, a FORTRAN software program of Appendix B inputs a suitable thickness of removal. In response to the suitable thickness of removal, the program of Appendix B outputs a suitable gauge reading for each LPE film for achieving the suitable thickness. Optionally, the program of Appendix B can be enhanced to input a suitable orientation and thickness of removal for each LPE film. Such an enhanced program outputs suitable gauge readings associated with multiple points on each LPE film for achieving the suitable orientation and thickness.

An exemplary printout from the FORTRAN program of Appendix B is shown below:

| Gauge reading for FILM A (microns) | 0.0 |
|---|---|
| Gauge reading for FILM B (microns) | 3.0 |
| Gauge reading for FILM C (microns) | 17.0 |
| Gauge reading for FILM D (microns) | 10.0 |
| Gauge reading for FILM E (microns) | 15.0 |
| Gauge reading for FILM F (microns) | 3.0 |

DPT off = 22.0 μm

In this example, FILM A is the highest film, such that its gauge reading is 0.0 μm. Accordingly, the amount to be removed from FILM A is 22 μm (22 μm−0 μm). The gauge readings of remaining films are relative to FILM A. The respective amounts to be removed from FILMS B, C, D, and E are 19 μm, 5 μm, 12 μm, 7 μm, and 19 m.

The technique of the preferred embodiment has been successfully tested for accuracy of LPE film position and removal, thermal stability of base 20 and stand 100, transferability of base 20 from stand 100 to reference structure 120, and transferability of base 20 from reference structure 120 to a different site for the DPT operation.

The technique of the preferred embodiment has successfully held and positioned more than 4,000 LPE films for DPT operations. With the technique of the preferred embodiment, output is increased by at least 400% during the time for setting up and performing the DPT operation. Six LPE films have been diamond point turned in ten minutes, compared with over 1.5 hours when the same number of LPE films are singularly subject to the DPT operation. Averaged over the four corners of each LPE film, the technique of the preferred embodiment has achieved better than approximately ±0.5–1 μm accuracy for the amount removed.

Although the present invention and its advantages have been described in detail, it should be understood that various changes, substitutions and alterations can be made therein without departing from the spirit and scope of the invention as defined by the appended claims.

APPENDIX A

| Dimension | Value (inches) | Dimension | Value (inches) |
|---|---|---|---|
| A | 0.1 | AA | 2.9 |
| B | 0.750 | AB | 2.525 |
| C | 0.367 | AC | 3.3 |
| D | 0.9 | AD | 2.0 |
| E | 1.0 | AE | 2.25 |
| F | 0.375 | AF | 0.5 |
| G | 1.75 | AG | 1.4 |
| H | 0.30 | AH | 2.75 |
| I | 0.047 | AI | 1.75 |
| J | 2.05 | AV | 0.25 |
| K | 1.783 | AW | 0.030 |
| L | 1.25 | AX | 4.0 |
| M | 0.683 | AY | 0.4 |
| N | 0.95 | AZ | 0.375 |
| P | 0.625 | | |
| Q | 0.625 | | |
| R | 1.125 | | |
| S | 1.658 | | |
| T | 1.925 | | |
| U | 0.15 | | |
| V | 0.375 | | |
| W | 5.0 | | |

APPENIX B

```
*       A program for use with the multifilm puck and the Diamond
*       Point Turning operation. Inputs are the amount to be removed
*       from each of the six LPE films. Output is the required setting
*       on the gauge used to suitably position each film.
        REAL F1, F2, F3, F4, F5, F6, FL, FH, FT
        F1 = 0
        F2 = 0
        F3 = 0
        F4 = 0
        F5 = 0
        F6 = 0
        PRINT *,' '
        PRINT *,' '
        PRINT *, 'THIS PROGRAM GIVES THE REQUIRED GAUGE READINGS'
        PRINT *, 'SO THAT THE DPT OPERATION WILL REMOVE THE RIGHT'
        PRINT *, 'AMOUNT FROM EACH LPE FILM'
100     CONTINUE
        PRINT *,' '
        PRINT *,' '
        PRINT *, 'ENTER AMOUNT TO BE DPTed FROM FILM A'
        PRINT *, '(ENTER 999 TO EXIT)'
        READ *, F1
        IF (F1 .EQ. 999) GOTO 900
        PRINT *,' '
        PRINT *,' '
        PRINT *, 'ENTER AMOUNT TO BE DPTed FROM FILM B'
        READ *, F2
        PRINT *,' '
        PRINT *,' '
        PRINT *, 'ENTER AMOUNT TO BE DPTed FROM FILM C'
        PRINT *, '(IF THERE ARE NO MORE FILMS, ENTER 999)'
        READ *, F3
        IF (F3 .EQ. 999) GOTO 300
        PRINT *,' '
        PRINT *,' '
        PRINT *, 'ENTER AMOUNT TO BE DPTed FROM FILM D'
        PRINT *, (IF THERE ARE NO MORE FILMS, ENTER 999)'
        READ *, F4
```

-continued

APPENIX B

```
        IF (F4 .EQ. 999) GOTO 300
        PRINT *,' '
        PRINT *,' '
        PRINT *, 'ENTER AMOUNT TO BE DPTed FROM FILM E'
        PRINT *, '(IF THERE ARE NO MORE FILMS, ENTER 999)'
        READ *, F5
        IF (F5 .EQ. 999) GOTO 300
        PRINT *,' '
        PRINT *,' '
        PRINT *, 'ENTER AMOUNT TO BE DPTed FROM FILM F'
        READ *, F6
300     CONTINUE
        IF (F1 .LE. F2) FL = F1
        IF (F2 .LE. F1) FL = F2
        IF (F3 .EQ. 999) GOTO 400
        IF (F3 .LE. FL) FL = F3
        IF (F4 .EQ. 999) GOTO 400
        IF (F4 .LE. FL) FL = F4
        IF (F5 .EQ. 999) GOTO 400
        IF (F5 .LE. FL) FL = F5
        IF (F6 .EQ. 999) GOTO 400
        IF (F6 .LE. FL) FL = F6
400     CONTINUE
        PRINT *,' '
        PRINT *,' '
        WRITE (1, 411) F1 - FL
        WRITE (6, 411) F1 - FL
        WRITE (1, 412) F2 - FL
        WRITE (6, 412) F2 - FL
        IF (F3 .EQ. 999) GOTO 450
        WRITE (1, 413) F3 - FL
        WRITE (6, 413) F3 - FL
        IF (F4 .EQ. 999) GOTO 450
        WRITE (1, 414) F4 - FL
        WRITE (6, 414) F4 - FL
        IF (F5 .EQ. 999) GOTO 450
        WRITE (1, 415) F5 - FL
        WRITE (6, 415) F5 - FL
        IF (F6 .EQ. 999) GOTO 450
        WRITE (1, 416) F6 - FL
        WRITE (6, 416) F6 - FL
411     FORMAT ('      Gauge reading for FILM A (microns): ', F4.1 )
412     FORMAT ('      Gauge reading for FILM B (microns): ', F4.1 )
413     FORMAT ('      Gauge reading for FILM C (microns): ', F4.1 )
414     FORMAT ('      Gauge reading for FILM D (microns): ', F4.1 )
415     FORMAT ('      Gauge reading for FILM E (microns): ', F4.1 )
416     FORMAT ('      Gauge reading for FILM F (microns): ', F4.1 )
450     CONTINUE
        IF (F1-FL .GE. F2-FL) FH = F1-FL
        IF (F2-FL .GE. F1-FL) FH = F2-FL
        IF (F3 .EQ. 999) GOTO 460
        IF (F3-FL .GE. FH) FH = F3-FL
        IF (F4 .EQ. 999) GOTO 460
        IF (F4-FL .GE. FH) FH = F4-FL
        IF (F5 .EQ. 999) GOTO 460
        IF (F5-FL .GE. FH) FH = F5-FL
        IF (F6 .EQ. 999) GOTO 460
        IF (F6-FL .GE. FH) FH = F6-FL
455     CONTINUE
*       Now find the largest number
        FT = F1
        IF (F2 .GE. FT) FT = F2
        IF (F3 .GE. FT) FT = F3
        IF (F4 .GE. FT) FT = F4
        IF (F5 .GE. FT) FT = F5
        IF (F6 .GE. FT) FT = F6
460     CONTINUE
        WRITE (1, 471)
        WRITE (6, 471)
        WRITE (1, 472) FT
        WRITE (6, 472) FT
        WRITE (1, 473)
        WRITE (6, 473)
        PRINT *,' '
        PRINT *, 'THIS DATA WILL BE FOUND IN FILE FOR001.DAT'
471     FORMAT (/,'      **************************',)
472     FORMAT ('        *DPT OFF ', F4.1' MICRONS *')
473     FORMAT ('      **************************')
600     FORMAT (8X, A, F4.1, X, A)
```

-continued

APPENIX B

900 END

What is claimed is:

1. A method of processing objects, comprising the steps of:
    holding one substrate with an LPE film on each of a plurality of platforms;
    mounting said platforms to a base; and
    positioning said platforms, independently from one another, for elevation and orientation relative to said base while said platforms are securely connected to said base.
    simultaneously removing an independently adjusted amount from each of the LPE films.

2. The method of claim 1 wherein said holding step comprises the step of holding at least one of the substrates with an LPE film to an associated one of said platforms by gluing.

3. The method of claim 1 wherein said platforms are individually adjusted at respective elevations relative to said base.

4. The method of claim 1 wherein said platforms are independently adjusted by adjusting screws to positioning independently from one another, for orientation relative to said base while said platforms are securely connected to said base at said respective elevations by holding screws.

5. The method of claim 1 and further comprising the step of supporting said base on a stand so that room is provided to access a bottom surface of said base and to adjust at least one of said platforms to achieve a particular elevation and orientation.

* * * * *